United States Patent [19]
Jacobsen

[11] Patent Number: 5,732,662
[45] Date of Patent: Mar. 31, 1998

[54] ANIMAL LEASH

[76] Inventor: Chris J. Jacobsen, 4020 County Rd. M., Middleton, Wis. 53562

[21] Appl. No.: 589,692

[22] Filed: Jan. 22, 1996

[51] Int. Cl.⁶ .................................................. A01K 27/00
[52] U.S. Cl. ................................................................ 119/798
[58] Field of Search ........................ 119/792, 793, 119/795, 797, 798, 799–805

[56] References Cited

U.S. PATENT DOCUMENTS

| | | |
|---|---|---|
| 54,729 | 5/1866 | Howe. |
| 81,947 | 9/1868 | Vizard. |
| D. 298,478 | 11/1988 | Ticknor ........................... D30/153 |
| D. 337,182 | 7/1993 | Small et al. ..................... D30/153 |
| 1,467,452 | 9/1923 | Rasmussen ...................... 119/799 |
| 2,248,114 | 7/1941 | Norton ............................. 119/797 |
| 2,322,897 | 6/1943 | Van Den Bogaerde, Jr. ... 119/799 |
| 2,684,682 | 7/1954 | Hudes et al. . |
| 2,712,932 | 7/1955 | Gould. |
| 2,737,154 | 3/1956 | Michonski ....................... 119/798 |
| 2,784,698 | 3/1957 | Dieppa. |
| 2,827,017 | 3/1958 | Ryan. |
| 2,861,547 | 11/1958 | Dale. |
| 2,866,436 | 12/1958 | Swain et al. .................... 119/799 |
| 2,889,807 | 6/1959 | Beebe. |
| 2,908,522 | 10/1959 | Glave. |
| 2,909,154 | 10/1959 | Thomas. |
| 2,911,947 | 11/1959 | Kramer. |
| 2,919,946 | 1/1960 | Miener. |
| 2,937,023 | 5/1960 | Seymour et al. . |
| 2,962,197 | 11/1960 | Spangler, Jr. . |
| 2,994,300 | 8/1961 | Grahling. |
| 3,072,097 | 1/1963 | Morehand. |
| 3,096,741 | 7/1963 | Ollstein. |
| 3,104,650 | 9/1963 | Grahling. |
| 3,115,227 | 12/1963 | Shanok et al. . |
| 3,208,586 | 9/1965 | Wilson. |
| 3,214,166 | 10/1965 | Gaudet ............................ 119/799 |
| 3,244,149 | 4/1966 | Bosko et al. . |
| 3,269,495 | 8/1966 | Bush ................................. 16/110 |
| 3,332,398 | 7/1967 | Mintz. |
| 3,395,675 | 8/1968 | Fowlkes. |
| 3,416,220 | 12/1968 | Wilson. |
| 3,426,559 | 2/1969 | Schubach. |
| 3,441,005 | 4/1969 | Fink. |
| 3,548,906 | 12/1970 | Murphy. |
| 3,563,208 | 2/1971 | Nero. |
| 3,603,295 | 9/1971 | Shuman. |
| 3,722,478 | 3/1973 | Smith. |
| 3,752,127 | 8/1973 | Baker. |
| 3,783,835 | 1/1974 | Kepirq. |
| 3,867,905 | 2/1975 | Vail, Jr. . |
| 3,870,296 | 3/1975 | Ellis. |
| 3,884,190 | 5/1975 | Gurrey. |
| 3,910,234 | 10/1975 | Henson. |
| 3,948,477 | 4/1976 | Lample. |
| 4,019,463 | 4/1977 | Kitchen. |
| 4,120,073 | 10/1978 | Studebaker. |
| 4,161,051 | 7/1979 | Brodwin. |
| 4,165,713 | 8/1979 | Brawner et al. . |
| 4,167,156 | 9/1979 | Kupperman et al. . |
| 4,182,258 | 1/1980 | Presser. |
| 4,182,272 | 1/1980 | Taff. |
| 4,255,830 | 3/1981 | Wilson. |
| 4,391,226 | 7/1983 | Guthrie ........................... 119/109 |
| 4,413,589 | 11/1983 | Bielen, Jr. et al. . |
| 4,488,511 | 12/1984 | Grassano. |
| 4,559,906 | 12/1985 | Smith. |
| 4,563,981 | 1/1986 | Kramer. |
| 4,638,764 | 1/1987 | Anderson. |
| 4,681,303 | 7/1987 | Grassano. |

(List continued on next page.)

Primary Examiner—Thomas Price
Attorney, Agent, or Firm—DeWitt Ross & Stevens SC

[57] ABSTRACT

An animal leash including an inelastic handle loop, an elastic lead, and a clip or equivalent attachment device at the end of the lead for attaching the lead to an animal. A rigid handle is situated on the handle loop to enhance the animal owner's grip. Lightweight and durable materials such as metal tubing, nylon straps, and elastic cord and straps are utilized and combined in such a manner flint the leash has an exceptionally attractive appearance.

21 Claims, 6 Drawing Sheets

U.S. PATENT DOCUMENTS

| | | |
|---|---|---|
| 4,735,035 | 4/1988 | Mattioli . |
| 4,745,883 | 5/1988 | Baggetta . |
| 4,763,609 | 8/1988 | Kulik . |
| 4,765,279 | 8/1988 | Klickstein . |
| 4,777,784 | 10/1988 | Feruson . |
| 4,866,813 | 9/1989 | Dupont . |
| 4,879,972 | 11/1989 | Crowe et al. . |
| 4,887,551 | 12/1989 | Musetti . |
| 4,892,063 | 1/1990 | Garrigan . |
| 4,903,638 | 2/1990 | Lacey . |
| 4,998,507 | 3/1991 | Browning . |
| 5,099,799 | 3/1992 | Giacobbe . |
| 5,233,942 | 8/1993 | Cooper et al. . |
| 5,291,856 | 3/1994 | Goller . |
| 5,351,654 | 10/1994 | Fuentes . |

ANIMAL LEASH

FIELD OF THE INVENTION

The present invention relates generally to leashes and tethers for animals, and specifically to leashes and tethers which include elastic leads.

DESCRIPTION OF THE PRIOR ART

Leashes and tethers for restraining the movement of animals have been known for centuries. Following is a survey of U.S. patents which illustrate animal leashes.

The following prior art illustrates a number of leashes which can be considered to be basic leashes.

U.S. Pat. No. 2,909,154 to Thomas illustrates a leash having a strap-like lead with a clip at one end and a handle loop and second clip at the other end. The clips and loops may be used in various ways to allow the leash to function as such and also as a tethering device to attach an animal to an anchoring object.

U.S. Pat. No. 4,167,156 to Kupperman et al. illustrates an animal leash comprising a highly reflective strap-like lead terminating in attachment means for attachment to an animal at one end and in a handle loop at its other end. The handle loop is formed by doubling a separate strap over and sandwiching the end of the lead at its ends, and then inserting fasteners through the ends of the lead and handle loop. The attachment means is in the form of a spring-loaded clip attached to a ring by a swivel connector. The ring is attached to the end of the lead by inserting the lead within the ring, doubling it over, and driving fasteners through the end of the lead.

U.S. Pat. No. 4,415,589 to Bielen, Jr. et al. illustrates a leash having a flexible lead resembling a looped strap which may function as a handle. The loop may engage an animal's collar, and it may be collapsed and attached onto the collar for easy transport.

U.S. Pat. No. 5,099,799 to Giacobbe illustrates a combined animal leash and collar comprising a strap-like elongated lead having a buckle at one end which allows that end of the leash to be formed into a collar, and a snap fastener at its other end which may be snapped at varying intermediate points along the lead to form a handle loop. A ring-like member may be located on the lead near its collar end to allow the lead to be coiled about the collar loop and retained within the member.

U.S. Pat. No. Des. 81,947 to Vizard illustrates a leash wherein a strap-like lead is doubled at one end and clamped to itself to form a handle loop. Attachment means is provided at the opposing end of the lead.

U.S. Pat. No. Des. 339,885 to Rebek illustrates a leash having a strap-like lead terminating in a handle loop at one end and in attachment means at the other end. The handle appears to be made of a padded or foam material looped into a generally triangular form and joined to the lead at a vertex of the triangle.

The prior art also illustrates basic leashes which are similar to those described above, and which are primarily of interest owing to their means of manufacture. Several examples of hand-manufactured leashes follow.

U.S. Pat. No. 2,827,017 to Ryan illustrates a leash having a strap-like lead with a handle loop at one end and attachment means at the other end. The Ryan leash is interesting for the fact that it needs no rivets, stitching, glue, or other machine assembly operations to affix the handle loop or attachment means to the lead. The handle loop is formed in the lead by providing the handle end of the lead with a clip, passing the handle end of the lead through the lead at any one of a series of longitudinally-aligned slits located along the lead, fitting a metal ring through the loop formed thereby, and then attaching the clip at the handle end of the lead to this ring. A similar procedure is used to place the attachment means on the opposite end of the lead. If desired, the clip may be removed and a metal ring attached instead so that a slip loop or "choker" collar may be formed from the clipped end of the lead.

U.S. Pat. No. 3,783,835 to Kepirq illustrates a leash including a strap-like lead. To provide handle and collar loops, the portions of the lead adjacent each of its ends is slit longitudinally. The ends of the leads are inserted therein and braided with the lead adjacent the slit.

The prior art further illustrates a number of leashes with flexible and elastically extensible leads. Examples of such leashes are set out below.

U.S. Pat. No. 1,924,596 to Davis illustrates a cord-like leash made of flexible rubber. A handle is integrally formed with the lead, and attachment means is provided at the other end of the lead. The attachment means is partially imbedded within the lead.

U.S. Pat. No. 3,096,741 to Ollstein illustrates a leash having a lead and integral collar made of braided stranded material. The collar and leash are extensible in both axial and radial directions, making the lead flexible and extensible and the collar comfortable to wear.

U.S. Pat. No. 3,603,295 to Shuman notes that the leash illustrated therein may be flexible and to some extent stretchable and deformable.

U.S. Pat. No. 4,777,784 to Ferguson illustrates a lead for tethering large animals comprising a central stretchable resilient core, a braided sheath covering the core, and a loosely fitting protective plastic outer covering disposed over the braided sheath. The lead stretches when subjected to tension, and the core has a stretch length breaking point less than the stretch length breaking point of the sheath. Therefore, if the lead is stretched to such an extent that the central core snaps, the sheath will still remain intact to restrain an animal.

U.S. Pat. No. Des. 337,182 to Small et al. illustrates a design for a "stretchable animal leash." The leash has a lead terminating at one end in an aperture for accommodating attachment means, and at the other end in a rod-like member aligned generally perpendicularly to the lead. A handle loop is formed by pivotably attaching a strap to the opposing ends of the rod-like section.

Also note U.S. Pat. No. 4,745,883 to Baggetta, discussed below, which illustrates a flexible and extensible child safety tether.

The prior art additionally illustrates leashes with leads which may be telescopically extended and retracted within a sheath or similar structure. Several examples follow.

U.S. Pat. No. 2,337,970 to Cassell illustrates a dog leash having a handle attached to a series of rigid spring-loaded telescopic tubes. At the end of the furthermost tube from the handle, a short flexible lead is provided with a clip at its end for attachment to an animal. The telescopic tubes provide a generally inflexible (but extensible) stick-type lead. A latch is provided so that the telescopic tubes may be fixed together at a set length to prevent undesired further extension.

U.S. Pat. No. 2,593,940 to Van Meter illustrates an animal leash having a loop attached to a tubular member. A spring is disposed within the tubular member, and a flexible cord-like lead is attached to the end of the spring to allow the lead to be extended at varying lengths out of the tube. The tube may include a plug at the juncture between the spring and the lead, and this plug may resist passage through the tube due to air pressure differences between the opposing sides of the plug. A clip is disposed at the end of the lead to allow attachment to an animal. The rigid tube is said to prevent entanglement of the leash about the user's hand, and it also allows a greater degree of control over the animal attached to the lead.

U.S. Pat. No. 2,737,154 to Michonski illustrates a leash having a handle loop at one end, a clip at the other end, and a flexible elastic lead therebetween comprised of an elastic cord disposed within the coils of a spring. The spring and the cord provide a flexible and extensible lead which is resistant to twisting or coiling about the legs of an animal.

U.S. Pat. No. 3,441,005 to Fink illustrates a leash which includes a semi-flexible, non-stretchable tube having a handle loop at one end. An elastic cord is enclosed within the tube and projects beyond the end of the tube to function as a lead. A clip is provided at the end of the cord for attachment to an animal. Means are also provided whereby the elastic cord may be attached to the tube at any point throughout the length thereof to allow variation in the stretch length of the elastic cord. These means are illustrated in the form of a sliding member which twists the tube and cord to inhibit stretching of the cord between the sliding member and the handle, but which allows stretching of the cord between the sliding member and the clip.

Several spring and/or pneumatic cylinders for allowing shock-absorbent expansion and contraction of leashes and tethers are illustrated in U.S. Pat. No. 197,615 to Dawson; U.S. Pat. Nos. 198,275 to Chase; 1,194,417 to Pelham; 2,712,932 to Gould; 4,488,511 to Grassano; and 4,681,303 to Grassano.

The prior art also illustrates substantially inelastic leads which are described to be resistant to sagging and tangling about an animal's legs, and which are often reputed to allow better control of an animal attached thereto. Several examples follow.

U.S. Pat. No. 54,729 to Howe illustrates a lead for animals wherein a number of bead-like members are strung onto a lead to add stiffness to the lead and to prevent it from easily coiling about the legs of an animal.

U.S. Pat. No. 2,322,897 to Van den Bogaerde, Jr. illustrates a leash having a loop at one end, a clip at its other, and a rod-like, inelastic lead disposed therebetween. The rigidity of the lead prevents it from coiling about the legs of an animal, and it also allows better control of the animal.

U.S. Pat. No. 236,091 to Rodger illustrates a leash lead wherein a rigid rod-like member is attached to the animal's collar. A flexible cord is then attached to the end of this rod to form the remainder of the lead. The rod-like member prevents the portion of the lead adjacent the animal's collar from tangling about the animal's legs.

U.S. Pat. No. 548,062 to Joyner illustrates a lead including a flexible cord-like portion connected to a spring portion. A clip is attached to one end of the spring for attachment to an animal. Cylindrical tubular members are disposed over the spring portion to prevent the spring portion of the lead from coiling about an animal's legs.

U.S. Pat. No. 1,509,781 to Roth illustrates a leash having a generally rectangular lead with a clip at one end for attachment to an animal and an integrally-formed handle loop at the other end. The lead is generally flexible, but the portion of the lead adjacent the clip contains a metal insert therein to add rigidity to that portion of the lead. A tubular sliding member may be disposed at varying points on the handle loop portion of the lead to vary the diameter of the handle loop.

U.S. Pat. No. 2,911,947 to Kramer illustrates a animal leash having a handle loop at one end, a clip at the other end, and a lead comprising a helical spring therebetween. The helical spring is coated with abrasion-resistant protective material to prevent the spring from damaging either the legs of an animal or other objects if the lead should rub against such objects. The lead is resistant to tangling about the legs of an animal or other objects owing to its tendency to maintain constant tension in the lead.

U.S. Pat. No. 3,395,675 to Fowlkes illustrates a leash intended for overhead attachment to a horizontally-suspended tether line. The leash includes clips on either end of a lead. The lead includes a centrally-located rigid bar attached to two short flexible lengths of chain at either end between the rod and the bar.

U.S. Pat. No. 3,722,478 to Smith illustrates a leash which comprises a number of rigid link members terminating in loops which may be attached to other link members, or which may instead serve as handle loops. The links may be clad in protective sheathing such as rubber. The rigidity of the members prevents them from tangling about the animal's legs or other objects, and they also prevent damage to an anchoring object to which the leash is attached.

U.S. Pat. No. 3,884,190 to Gurrey illustrates a leash lead formed of coiled wire coated with a softer sheathing material. The leash has a tendency to remain coiled as it is being used, and thus it remains clear of the ground and avoids entangling the animal's legs.

U.S. Pat. No. 4,735,035 to Mattioli illustrates a lead rope for use in a leash wherein the lead rope includes a tubular sheath made of a woven fabric and an inner core made of a soft fibrous material. At one end of the lead, the inner core is replaced by a rigid rod, and this end may be attached to the animal to prevent the lead from entangling the animal and to also allow greater control of the animal by grasping the rod.

U.S. Pat. No. 4,998,507 to Browning illustrates a leash lead made of resilient flexible material which is resistant to bending, but which may be curved or coiled by an animal owner when desired. Because the lead tends to restore itself to a generally straight condition, it will not tangle about an animal or other objects.

U.S. Pat. No. 5,291,856 to Goller illustrates a leash lead which is generally stiff and inflexible save for a flexible portion near its distal end. The stiff portion prevents the lead from becoming slack, dragging on the ground, and entangling the animal's legs.

Also note U.S. Pat. Nos. 2,994,300 and 3,104,650 to Grahling, discussed below, which illustrate a helical spring child safety tether.

Several patents illustrate leashes which are substantially inflexible to allow a high degree of control over an animal. Several examples follow.

U.S. Pat. No. 2,784,698 to Dieppa illustrates a short rigid leash comprised of a metal member having a handle at one end and a longitudinally-aligned slot. The slot at one end of the member may engage a peg on an animal's collar. A sleeve is then disposed over the member and in the slot so that it may slide down to abut the peg and prevent it from sliding within the slot. A thumbscrew is then provided on the sleeve to allow the sleeve to be affixed to the member so that it cannot slide and allow the peg to slip.

U.S. Pat. No. 3,244,149 to Bosko et al. illustrates various embodiments of an animal training stick wherein a lead is either slidably attached within eyelets, channels, or similar guides on or within the stick, or fixedly attached to the end of the stick to allow greater control of an animal. As an example of one embodiment, the training stick is provided with a handle at one end and a rigid tubular stick extending therefrom, with a flexible lead slidably disposed within the stick. By pulling on the end of the lead adjacent the handle loop, the animal may be pulled closer to the end of the stick. In all embodiments, the lead may be pulled to shorten its operational length at the end of the stick. Because the sticks are rigid, the animal is subject to a greater degree of control.

The prior art illustrates several leashes with leads which automatically retract within a winding drum or similar containment means when tension is relieved from the lead. A summary of such leashes follows.

U.S. Pat. No. 2,314,504 to Lifschultz illustrates a leash having a handle which acts as a winding drum. A leaf spring within the handle maintains tension on the lead as it is withdrawn and prevents the lead from sagging and tangling the legs of an animal, and it also prevents the need for having to re-coil the lead within the handle manually. Quick-acting lock means are illustrated whereby the user may prevent the lead from playing out or winding in after the lead has been extended from the handle by a desired length. A clip is provided at the end of the lead to attach the lead to an animal.

U.S. Pat. No. 2,889,807 to Beebe illustrates a dog leash having a cord-like lead terminating in a handle loop at one end and in a winding drum at the other end. The winding drum, which automatically spools the lead into and out of the drum, is attached to an animal's collar. Different methods of constructing the winding drum to extend the life of the leash are described.

U.S. Pat. No. 4,165,713 to Brawner et al. illustrates a retractable leash having a winding drum wherein a spring-biased rotatable reel is provided to allow a lead and clip to be pulled therefrom and automatically reeled in when tension on the lead is relieved. A handle encircles and resiliently biases into engagement with the winding drum when the leash is not in use.

U.S. Pat. No. 4,887,551 to Musetti illustrates a retractable leash wherein a lead is attached to a spring mounted within a winding drum to allow the lead to be manually pulled out of the winding drum and automatically reeled back in by the spring.

U.S. Pat. No. Des. 339,430 to Reed et al. illustrates a housing/handle for a retractable leash wherein the winding drum has finger indentations on one of its circumferential sides. The lead extends from the drum at a side of the housing opposite the indentations.

U.S. Pat. No. Des. 341,682 to Musetti illustrates a housing/horn for a retractable leash wherein the winding drum has finger indentations on one of its circumferential sides, and wherein the lead extends between the user's fingers.

U.S. Pat. No. Des. 351,264 to Stout illustrates a housing/handle for a retractable leash wherein a handle loop with finger indentations extends from a circumferential side of the winding drum.

Closely related to the leashes with retractable leads are leashes which contain containment means for containing their leads when they are not in use. A summary of several such leashes follows.

U.S. Pat. No. 2,866,436 to Swain et al. illustrates a leash having a handle formed of a generally elliptical ring through which a user's fingers may be extended. A slot extends about the circumference of the ring. A cord-like lead may be tied within this slot and then coiled within the slot by winding it about the handle. A clip is provided at the end of the lead. A bead-like plug may be affixed to the lead adjacent the clip so that the plug may be friction-fit into the slot, thereby allowing the handle to be carried without having the lead unwinding.

U.S. Pat. No. 5,233,942 to Cooper et al. illustrates a carrying case which attaches to a pet collar and which contains a leash therein. The leash may be quickly deployed from the carrying case by grasping the leash handle and pulling the cord-like leash from the carrying case.

The prior art includes leashes which have attachment means for attachment to an animal wherein the attachment means may be quickly and remotely disengaged to allow the animal to be released. Examples of such leashes follow.

U.S. Pat. No. 1,161,870 to Kunze illustrates a lead with a first handle loop formed adjacent its middle portion. The lead is doubled over so that the first handle loop is adjacent the fold, and the end of the lead closest to the first handle loop is provided with a clip. The other end of the lead is provided with a ring which is capable of engaging the legs of the clip to open it. By doubling the lead over, a second handle loop is formed adjacent the first handle loop. When the clip is affixed to an animal and the first handle loop is grasped, the leash may be used in an ordinary fashion. When the first handle loop is released and the second handle loop is grasped instead, the ring will engage the clip to allow it to open. Therefore, the leash provides a quick-release restraining device for police dogs and the like.

U.S. Pat. No. 3,910,234 to Henson illustrates a leash having an inflexible tubular lead with a central flexible portion, a handle loop at one end, and an arcuate bend at the other end. A spring-loaded rod member is disposed within the tubular lead adjacent the arcuate bend to close the arcuate bend, thereby forming attachment means for attaching the lead to an animal. An elongated member is attached to the rod member and extends through tubular lead, and also through the central passage of the spring up to the handle loop, where it terminates in a finger loop. When the finger loop is actuated, the member is pulled out of the arcuate bend to quickly release an animal.

U.S. Pat. No. 4,903,638 to Lacey illustrates an animal leash similar to that of U.S. Pat. No. 3,910,234 to Henson. The leash includes a handle loop and a flexible lead which terminates in a clip whose jaws are held latched by a yieldably biased sleeve disposed about the jaws. The sleeve is retractable by a pull cord extending rearwardly within the lead and terminating near the handle loop. The clip may be remotely detached by pulling the pull cord.

The prior art illustrates a number of leashes which include leads with multiple straps and loops to provide multiple handles for varying degrees of control over the animal. Examples of such leashes follow.

U.S. Pat. No. 2,861,547 to Dale illustrates a leash having a strap-type lead with a handle loop at one end and attachment means at the other end. Buckles and rings are provided whereby the lead may be formed into one or more loops of varying size, thereby allowing varying degrees of control over an animal attached to the leash.

U.S. Pat. No. 3,332,398 to Mintz illustrates a strap-like leash lead which terminates in handle loops at both ends. One handle loop can be attached to the animal's collar by use of attachment means and the opposing handle loop can be used as a handle. Alternatively, both ends can be attached to the animal's collar to provide a shorter lead with a larger loop which can be used as a handle. In that case, either or both of the handle loops could also be grasped to provide greater control over the animal.

U.S. Pat. No. 3,752,127 to Baker illustrates an animal leash having a strap-like lead terminating in loops at both of its ends, one of which is larger than the other and which is capable of serving as a handle. Each loop includes attachment means which may be attached to an animal's collar or to the loop at the opposite end of the lead. If desired, either attachment means may be attached to the loop at the opposite end of the lead to form a large loop, allowing the attachment of the lead to a fencepost or the like.

U.S. Pat. No. 4,763,609 to Kulilc illustrates a leash including multiple strap-like leads connected together by rings and terminating in attachment means. The lead may be folded over itself at different points and the attachment means may be connected to different rings to form handle loops or anchoring loops of varying size.

U.S. Pat. No. 5,351,654 to Fuentes illustrates a lead which is generally made of two straps connected together by rings to form a lead made of multiple connected loops. The loops allow different portions of the lead to serve equally well as handles or as anchoring points for tethering of collars or leads.

Also see U.S. Pat. No. 1,161,870 to Kunze, discussed above, for another example of a multi-loop, multi-handle lead.

The prior art illustrates several examples of leashes adapted to allow the tethering of several animals. Examples of such leashes follow.

U.S. Pat. No. 4,879,972 to Crowe et al. illustrates a leash for two animals. A main leash includes a handle lead having large attachment means at one end and a handle loop at its other end. Two secondary leashes are also provided. These secondary leashes are similar to the main leash, but have smaller handle loops and attachment means. These secondary leashes may have their loops engaged in the large attachment means, and then their attachment means may be attached to animals.

U.S. Pat. No. 4,892,063 to Garrigan illustrates a leash for two or more animals comprising multiple leads having attachment means at one end and rings or ring clips at the other end. Several leads can be all engaged together at a common ring or ring clip, thereby forming a multiplicity of leads all extending from the common point. A tubular handle member may then be slid over the common point to provide a common handle for all of the leads.

U.S. Pat. Nos. 3,563,208 to Nero and 4,563,981 to Kramer, discussed below, also describe multi-lead child safety tethers.

The prior art illustrates a number of leashes which include slip loop or "choker" collars wherein pulling on the lead causes the animal's collar to tighten. Examples of such leashes follow.

U.S. Pat. No. 2,289,802 to Norton illustrates a cord-like leash wherein one end is looped over and clamped to an intermediate portion of the lead to provide a handle loop, and which is similarly looped over and clamped at the other end to provide a small loop. The lead may be extended through the small loop to form a collar loop. A rectangular-shaped ring is then disposed about both the collar and the lead adjacent the small loop. The loop collar may be manually adjusted to different sizes, but the rectangular ring prevents the lead from slipping and allowing the collar loop to change in size.

U.S. Pat. No. 3,867,905 to Vail, Jr. illustrates a leash having a lead made of chain which terminates in a handle loop at one end. A lock housing is disposed at the other end of the lead and is adapted to receive an intermediate portion of the lead. The lock housing may be slid along the intermediate portion of the chain to form a variably-sized collar loop. The size of the collar loop may be fixed by turning a key within the lock housing, which causes the lock housing to engage the chain lead.

U.S. Pat. No. 4,019,463 to Kitchen illustrates strap-like and cord-like leashes having a handle loop at one end and an adjustably-sized collar loop at the other end. The patent illustrates different means for sliding about an intermediate portion of the lead and adjusting the size of the collar loop, and these may be generally described as sliders which engage a terminal end of the lead and which also slidably engage an intermediate portion of the lead. Stop knobs or knots may be provided on the collar loop to prevent the loop from reducing in size to such an extent that the animal is choked.

Also see U.S. Pat. Nos. 1,924,596 to Davis and 2,27,017 to Ryan for other examples of a choker collar. In particular, U.S. Pat. No. 1,924,596 to Davis illustrates a rubber leash wherein the choker collar loop automatically releases after it is tugged and tightened owing to the resilience of the rubber lead.

The prior art includes several examples of unique leash handles with varying structures and functions. Examples of these leash handles follow.

U.S. Pat. No. 3,603,295 to Shuman illustrates a leash lead which appears to include a choke collar opposite the handle end of the lead. The handle end of the lead is looped over and inserted within an aperture on an intermediate portion of the lead, thereby forming a slip loop which functions as a handle loop for fitting about a user's wrist. The handle end of the lead terminates in a hand grip which may be grasped by the user's fingers. Thus, when a user inserts his or her hand within the handle loop and grasps the hand grip, any pulling on the hand grip (as when the animal rags on the lead) will cause the handle loop to tighten about the user's wrist.

U.S. Pat. No. 4,391,226 to Guthrie illustrates a handle for a dog leash whereby the lead slidably passes through an aperture in the handle. The lead may be fixably retained on the handle by adjusting a finger knob which actuates a cam against the lead within the interior of the handle.

U.S. Pat. No. Des. 175,316 to Roccia illustrates a rod-like leash handle having twisted cable configuration. The leash handle includes a strap-like buckled loop protruding from one end of the handle and an eyelet at the other end.

U.S. Pat. Des. 281,631 to Konar illustrates a leash handle design wherein the handle includes a generally trapezoidally shaped loop with a wider proximal end and a narrower distal end. A clip is imbedded within the distal end to attach the handle to a lead. The proximal end includes a smooth side on the exterior of the loop and finger ridges on the inside of the loop for accommodating fingers. Straight limbs connect the proximal and distal ends and close the loop.

U.S. Patent No. Des. 298,479 to Ticknor illustrates a leash handle which appears to be a hollow, generally U-shaped member with apertures at each of its ends. The lead may be inserted within the apertures and then fastened to itself so that when the lead is taut, the handle forms a grasping portion at the base of a generally triangular handle loop in the lead. The handle is shaped to generally accommodate a hand.

The prior art illustrates several leashes which provide for anchoring the leash to the animal owner by means other than the owner's grasping of a leash handle. Examples of such leashes follow.

U.S. Pat. No. 2,333,488 to Parth illustrates a leash which is generally comprised of two leads with a swivel attachment therebetween. Each lead is made of a looped strap. The strap of one loop passes through the animal's collar (or through a ring thereon), and it includes a quick-release clip to allow the loop to be quickly opened to release the animal. The other loop is designed to fit about the waist or shoulders of the user so that the user may restrain the animal while having both hands free. This loop includes buckles and slip rings to allow its size to be adjusted.

Also see U.S. Pat. No. 4,638,764 to Anderson, discussed below, which illustrates a child safety tether adapted to be anchored about a parent's waist.

The prior art illustrates several leashes which include built-in means for assisting in the training of animals. Examples of these leashes follow.

U.S. Pat. No. 3,072,097 to Morchand illustrates an animal leash having a strap-like lead with a handle loop at one end and a clip at the other end. An air passage is disposed throughout the length of the lead. The end of the air passage adjacent the animal includes a whistle, and the end of the air passage adjacent the handle loop includes a compressible air bulb. The animal owner may squeeze the air bulb to activate the whistle for use in training the animal.

U.S. Pat. No. 4,182,272 to Taft illustrates an animal training stick resting within the coils of a helical spring. A cord-like lead with terminal attachment means is attached to the end of the helical spring. The lead passes through one or more eyes or similar guide members along the staff. The first end of the staff is intended to be attached to a wall, tree, or similar anchoring object, and an animal is attached to the attachment means. If the animal should lunge at passerby, the tension in the spring will pull on the stick and cause it to follow and strike the animal.

The prior art illustrates several harnesses for engaging the bodies of animals for purposes of increased control. U.S. Pat. Nos. 1,556,362 to Silbert and U.S. Pat. No. 2,526,140 to Keyston illustrate animal harnesses. U.S. Pat. No. 3,870, 296 to Ellis illustrates a novelty harness for walking a nonexistent animal. U.S. Pat. No. 4,559,906 to Smith illustrates an animal harness which incorporates a handle disposed along the animal's back for carrying the animal. U.S. Pat. No. Des. 240,142 to Francis illustrates a dog control harness wherein a lead is connected to a harness which engages both the front portion of the dog's body and which also has a portion which engages the dog's tail.

The prior art also illustrates various leashes, i.e., safety tethers or restraining devices, for use on humans. Examples of these safety tethers follow.

U.S. Pat. No. 2,650,590 to Moore et al. illustrates an infant restraining device comprising a flexible elastic strap having two ends with snap members thereon. The snap members can be engaged to intermediate portions of the lead to provide loops at both ends of the lead. These loops may be placed about the legs of an infant to hinder the infant's movement.

U.S. Pat. No. 2,994,300 to Grahling illustrates a safety tether for a child. Collar-like loops are provided at either end of a helical spring lead which maintains constant tension between the loops. The loops may be detached from the lead by means of clips provided at the junctures between the loops and the lead.

U.S. Pat. No. 3,104,650 to Grahling illustrates a child safety tether similar to the one illustrated in the earlier U.S. Pat. No. 2,994,300 to Grahling.

U.S. Pat. No. 3,426,559 to Schubach et al. illustrates a device for restraining prisoners comprising an elongated flexible cord having a small terminal loop at one of its ends. This small loop is received about an intermediate portion of the cord to form a first loop. The cord further includes a snap hook at its opposite end which is detachably connected to an intermediate portion of the cord to form a second loop. The first and second loops may be connected about the wrists or ankles of a prisoner.

U.S. Pat. No. 3,563,208 to Nero illustrates an elongated main lead having a number of secondary leads and handle loops branching off therefrom for grasping by children. The device is intended to maintain the children in an organized group.

U.S. Pat. No. 4,563,981 to Kramer illustrates a device similar to that of U.S. Pat. No. 3,563,208 to Nero. Two leads extend from a common juncture, and handles are placed at various points on the leads for grasping by children. A handle for an adult is located at the common juncture.

U.S. Pat. No. 4,638,764 to Anderson illustrates a child safety tether comprising a flexible strap-like lead having first and second ends, each of which contain loops which may be detachably secured about the arm or waist of a child or adult.

U.S. Pat. No. 4,745,883 to Baggetta illustrates a child safety tether with two opposing loops and a lead therebetween. The lead is stretchable and includes an elastic member enclosed within a loose cloth sheath, the sheath being capable of accommodating stretching of the elastic member. Certain preferred stretch ratios for the lead are defined. The lead is illustrated with a generally rectangular, strap-like cross-section.

U.S. Pat. No. 4,765,279 to Klickstein illustrates a child safety tether comprising a flexible strap terminating at an adjustable loop at either end for attachment to the wrists of children or adults. The intermediate portion of the loop may be doubled over and buckled to allow the lead to be shortened.

SUMMARY OF THE INVENTION

The present invention encompasses an animal leash comprising an elongated substantially inelastic strap having opposing strap ends; an elongated substantially elastic lead having a proximal end and a distal end; binding means for binding the strap ends to the proximal end of the lead, thereby forming a handle loop from the strap; and attachment means at the distal end of the lead for attachment to an animal. The handle loop may include spacing means thereon for defining a rigid and generally straight grip portion on the handle loop. These spacing means may comprise a handle having a passage therein wherein the strap of the handle loop is disposed. The handle may include two substantially hollow or solid handle members disposed on opposing sides of the strap, and a handle sleeve disposed about the handle members to maintain the handle members in a fixed location relative to each other. The handle sleeve is preferably formed of a flexible and compressible material with a high coefficient of friction so that it is easily and comfortably gripped. The lead is preferably formed of a woven or molded strap or cord, such as a rubber strap, a rubber cord, or a woven cord, and the strap is preferably made of woven fabric material, such as woven nylon.

The present invention also encompasses a leash comprising a substantially inelastic handle loop including spacing means thereon for defining a rigid grip portion on the handle loop, and further including a soft handle sleeve disposed over the spacing means; an elongated substantially elastic lead having a proximal end and a distal end, wherein the proximal end is affixed to the handle loop at a point on the handle loop spaced from the grip portion; and attachment means at the distal end of the lead for attachment to an animal.

The present invention additionally encompasses a leash comprising a substantially rigid elongated loop member having two ends adjacently aligned, thereby defining a handle loop; a handle located on the handle loop and disposed over the two ends of the elongated loop member; a lead extending from the handle loop at a point spaced from the handle; and attachment means for attaching an animal to the lead. The lead may be substantially elastic, and may be formed of a woven or molded elastomeric strap or cord. The elongated loop member may be formed of rod-shaped material, and may further be coated with resilient material. The ends of the elongated loop member can have a generally greater diameter than the remainder of the elongated loop member, thereby preventing slippage of the handle across the handle loop, and they may be joined by welding or other attachment means. The handle loop may be made in a generally triangular form which includes a grip portion wherein the ends of the elongated loop member are located, and two side portions extending from the grip portion and meeting at a common vertex from which the lead extends. The side portions may each include a substantially linear segment thereon wherein the substantially linear segments are substantially parallel and meet at the common vertex.

The use of a substantially elastic lead allows the leash to be elastically extensible and shock-absorbent. Thus, if the leash is sharply tugged or if the animal should bolt, there is lesser chance of injuring the animal's neck or ripping the leash handle from the animal owner's grasp.

Additionally, substantial advantages in animal control and in comfort of use are believed to be gained by the use of a flexible but substantially inelastic handle loop in conjunction with the elastic lead. An inelastic handle loop avoids the pinching and slipping that an elastic handle loop can inflict on an animal owner's hand as it deforms, expands, and contracts within the animal owner's grasp. A rigid juncture between the handle loop and lead is preferred to increase the animal owner's ability to feel any tension or slack in the lead.

Further advantages are gained by utilizing a rigid grip portion on the handle loop. The presence of a rigid grip portion on the handle loop always defines an undeformable area whereupon the user's grip may be firmly maintained, and it prevents the side portions of the flexible handle loop from squeezing and biting into the animal owner's hand when tension is exerted on the lead. A high-friction compressible handle sleeve is preferably included over the rigid grip portion to allow the animal owner to obtain a firm grip on the leash without having to squeeze the handle or otherwise exert significant force on the handle.

An additional and significant advantage of the leashes of the present invention is that they are attractively styled and aesthetically pleasant in appearance, which greatly enhances their commercial appeal. Their pleasant appearance is largely due to the unique choice of materials used to construct the leashes.

Several unique leash handle designs will also be discussed in this specification. One handle utilizes a three-piece design wherein two handle members are inserted within a flexible handle sleeve on opposing sides of the strap of the handle loop. The handle sleeve maintains the handle members in a fixed position relative to each other about the strap of the handle loop. This allows the handle, which is generally the bulkiest part of the leash, to be assembled apart from the remainder of the leash, thereby allowing assembly of the handle to occur after the remainder of the leash is manufactured. This allows advantages in shipping, packaging, and display of the leashes.

Additionally, the handles may be firmly affixed to the handle loops, or they may be left "floating" on the handle loop so that they will have minimal resistance to sliding about the handle loop. A floating handle can be advantageous where the animal owner is jogging or performing other activities where a fixed handle might restrict the motion of the animal owner's hand and arm. Further advantages are gained by using a floating handle on an inelastic handle loop. A floating handle can bind and jerk on an elastic handle loop as the elastic loop is being expanded and contracted, but this will not occur on an inelastic handle loop.

For the reasons listed above and other reasons, the leashes of the present invention are believed to be easier and more comfortable to use than any animal leash illustrated in the prior art when engaging in activities such as jogging. Leashes according to the present invention are also exceedingly durable, relatively inexpensive to manufacture, and easy to clean, and they may be folded, rolled, or otherwise formed into a compact form for storage and transport.

Further features and advantages of the invention will be apparent from the detailed description located in this specification before the claims.

DETAILED DESCRIPTION OF THE INVENTION

Figure 1:
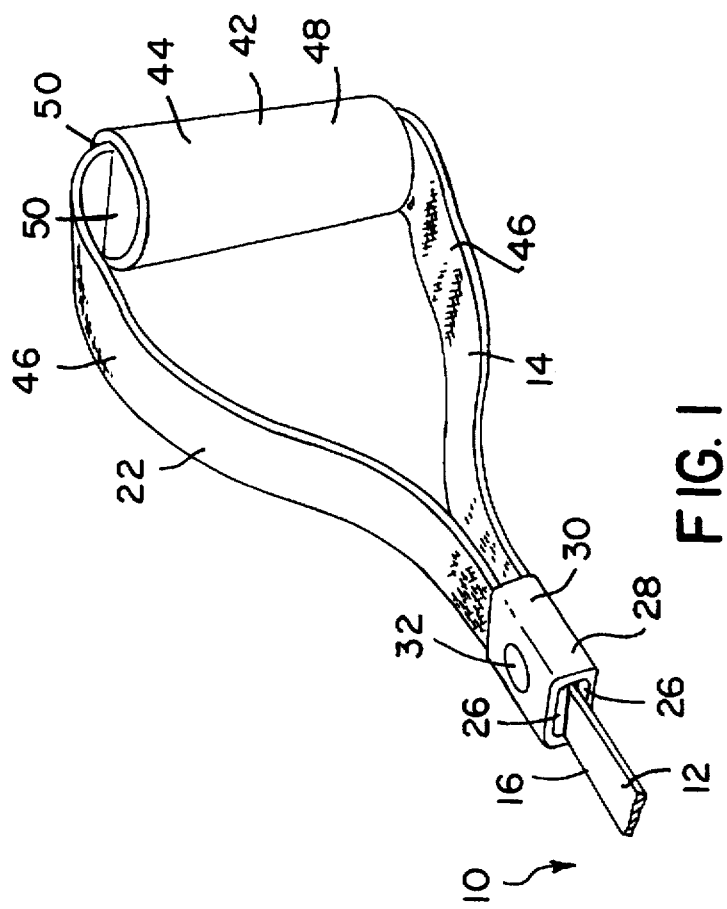
FIG. 1 is a perspective view of a first embodiment of a leash according to the present invention shown with a portion of its lead cut away.
Figure 1:
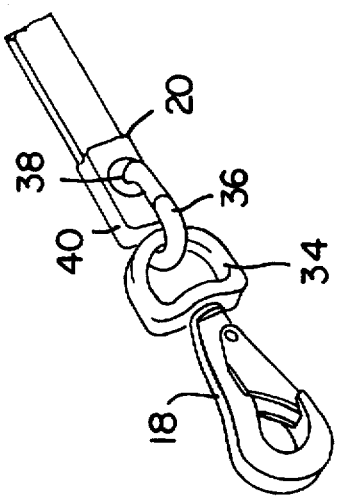

Following is a description of the preferred embodiments of the invention. Throughout this description, it is understood that the same or similar features are denoted in the drawings by the same reference numerals.

A first embodiment of a leash according to the present invention is shown in FIG. 1 designated generally by the reference number 10. The leash 10 has three main components: a lead 12, a handle loop 14 affixed to a proximal end 16 of the lead 12, and a clip 18 attached to a distal end of the lead 12. The lead 12 is preferably formed of a molded or woven elastomeric shock-absorbent material such as rubber, butyl rubber, isoprene, neoprene, or hypalon, or can be formed of other substantially elastic materials known to the art. The handle loop 14 is formed from an elongated strap 22 which is flexible but substantially inelastic, and is preferably formed of brightly colored woven nylon or other fabric materials. The clip 18 at the distal end 20 of the lead 12 is a standard clip known to the art, and it may take the form of any of the attachment means known to the prior art for attaching an animal to the distal end of a lead. Numerous examples of equivalent attachment means are illustrated in the prior art patents noted earlier in this specification.

Figure 2:
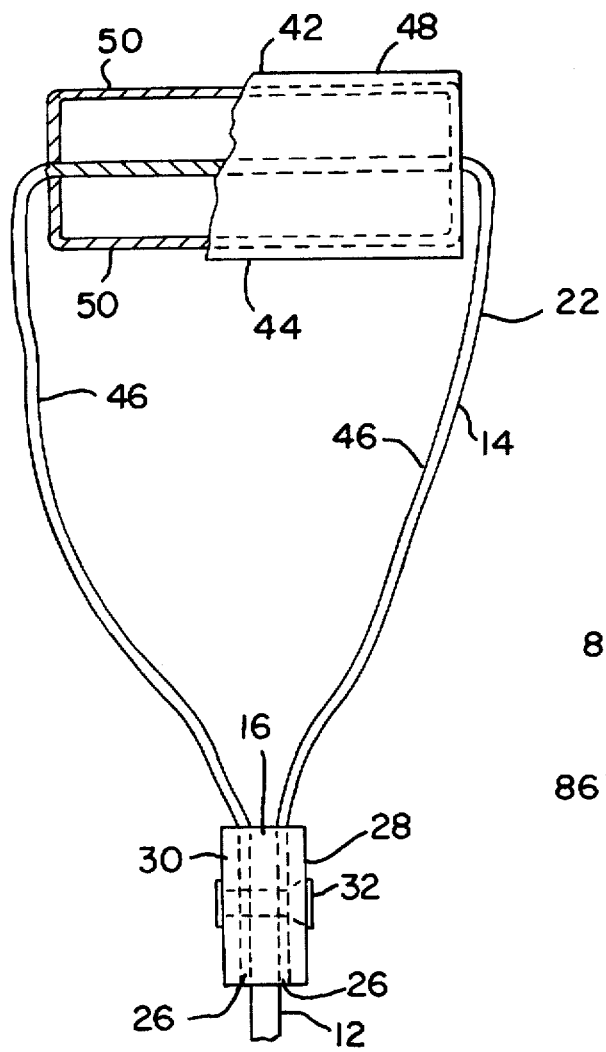
FIG. 2 is a side elevational view of the leash handle of FIG. 1 shown with a portion of the handle sleeve cut away from the handle.

The handle loop 14 is formed by doubling the strap 22 over and affixing its strap ends 26 to the proximal end 16 of the lead 12. As best illustrated by FIG. 2, this is preferably done by interposing the proximal end 16 of the lead 12 between the strap ends 26 and using binding means to firmly bind the strap ends 26 and proximal end 16 of the lead 12 together, thereby forming a rigid juncture 28 between the lead 12 and the handle loop 14. As illustrated in FIG. 1, the binding means may comprise a metal binding sleeve 30 which is fit about the strap ends 26 to the proximal end 16 of the lead 12. The binding sleeve 30 is crimped to tightly affix the strap ends 26 to the proximal end 16 of the lead 12. The binding means may also include a rivet 32 or equivalent fastener which is driven through both the strap ends 26 and the proximal end 16 of the lead 12. Alternatively, the binding means could include adhesives which affix the strap ends 26 to the proximal end 16 of the lead 12, or any other binding means known to the art for affixing articles together.

The clip 18 at the distal end 20 of the lead 12 is preferably a standard spring-biased clip 18 which is pivotably attached to a clip base ring 34. A ring 36 then affixes the clip base ring 34 to the distal end 20 of the lead 12 by engaging an aperture 38 in the distal end 20 of the lead 12. To reinforce the distal end 20 of the lead 12 and distribute the stress of the ring 36 more evenly across the distal end 20, the distal end 20 may either be thickened or it may be inserted within a terminal sleeve 40, as illustrated in FIG. 1. The terminal sleeve 40 is a hollow member adapted to receive the distal end 20 of the lead 12, and if desired it may be crimped or affixed to the distal end 20 by use of adhesives or other binding means. As an example, the terminal sleeve 40 may be no more than a U-shaped metallic member which is fit about the distal end 20 of the lead 12 and crimped.

One common disadvantage of prior art animal leashes having flexible handle loops is that the handle loop 14 tends to elongate from a generally circular open loop to a closed flattened loop when the lead 12 is subjected to tension. This tends to make the handle loop 14 uncomfortable to grasp for extended periods of time because the strap 22 pinches and digs into the animal owner's hand. To remedy this problem, the leash 10 preferably includes spacing means thereon for defining a rigid grip portion on the handle loop 14. As illustrated in FIG. 1, the spacing means can take the form of a rigid handle 42 which is disposed over the strap 22 of the handle loop 14, thereby sectioning the handle loop 14 into a rigid grip portion 44 and two flexible side portions 46. The handle 42 is preferably formed by stringing a flexible handle sleeve 48 onto the strap 22 prior to affixing the strap ends 26 together and forming the handle loop 14. Two semicylindrical handle members 50 are then inserted within the handle sleeve 48 on opposing sides of the strap 22 to complete the handle 42. As best illustrated by FIG. 2, each handle member 50 is preferably a hollow plastic or metal member to decrease the weight of the handle 42. The handle sleeve 48 is preferably an elastomeric sleeve which can stretch to accommodate insertion of the handle members 50 and which will maintain the handle members 50 in a fixed position relative to each other about the strap 22.

Figure 3:
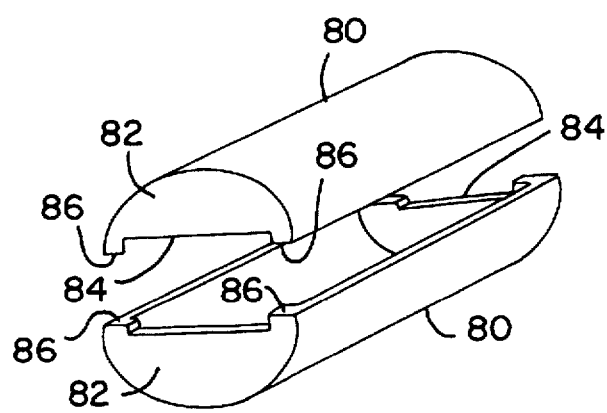
FIG. 3 is a perspective view of alternate handle members suitable for use in the leash of FIG. 1.

As shown at the handle 42 of FIG. 1, each of the handle members 50 may have a diameter which is substantially equal to the width of the strap 22. In that case, the handle sleeve 48 will tend to compress the handle members 50 tightly against the strap 22 to inhibit slippage of the handle 42 about the handle loop 14. This embodiment resists slippage of the handle 42 across the handle loop 14, but does not entirely prevent it. Alternatively, the handle members may take the form of the handle members 80 illustrated in FIG. 3. These handle members 80 have opposing generally semi-circular ends 82 which bear radially aligned slots 84 therein, and thereby define lands 86 at the opposing sides of their diameters. When a sleeve such as the handle sleeve 48 compresses the handle members 80 together, they will contact each other at the lands 86 so that they are not compressed directly against the strap 22. This allows the strap 22 to freely slide through the slots 84 of the handle 42.

It is understood that if the material used for the handle sleeve 48 is resilient enough and if it has sufficient plastic memory, the handle sleeve 48 may be slit lengthwise and slipped over the handle members 50 after the handle members 50 are installed on opposing sides of the strap 22. The plastic memory of the handle sleeve 48 will then cause it to tightly surround the handle members 50 to retain them in a fixed position relative to each other about the strap 22. Thus, the handle loops 14 may be formed without having to install the sleeve 48 on the handle strap 22 beforehand. This allows the entire handle 42 to be retrofit onto the handle loop 14 after the handle loop 14 and the remainder of the leash 10 have already been manufactured, packaged, and transported, and it also allows easy replacement of the handle 42 or removal of the handle 42 if the animal owner so desires.

Figure 4:
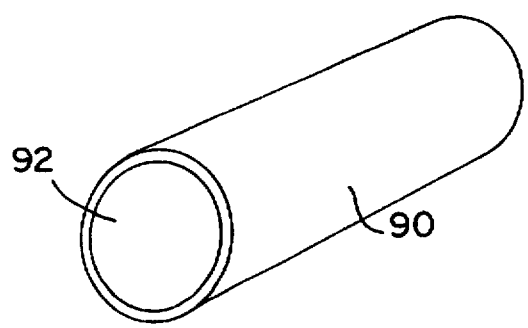
FIG. 4 is a perspective view of a second alternate handle member suitable for use in the leash of FIG. 1.

It is also understood that the handle members 50 and 80 may be formed in other than semicylindrical shapes, and that they may include ridges, lands, finger indentations, or other texturization to enhance the animal owner's grip. An example of a handle member which may be used in place of the handle members 50 and 80 is illustrated in FIG. 4 at the reference number 90. The handle member 90 is a generally cylindrical tubular member having an axial passage 92 wherein the strap 22 may be disposed. The relatively large diameter of the axial passage 92 allows the handle member 90 to freely slide across the strap 22.

Figure 5:
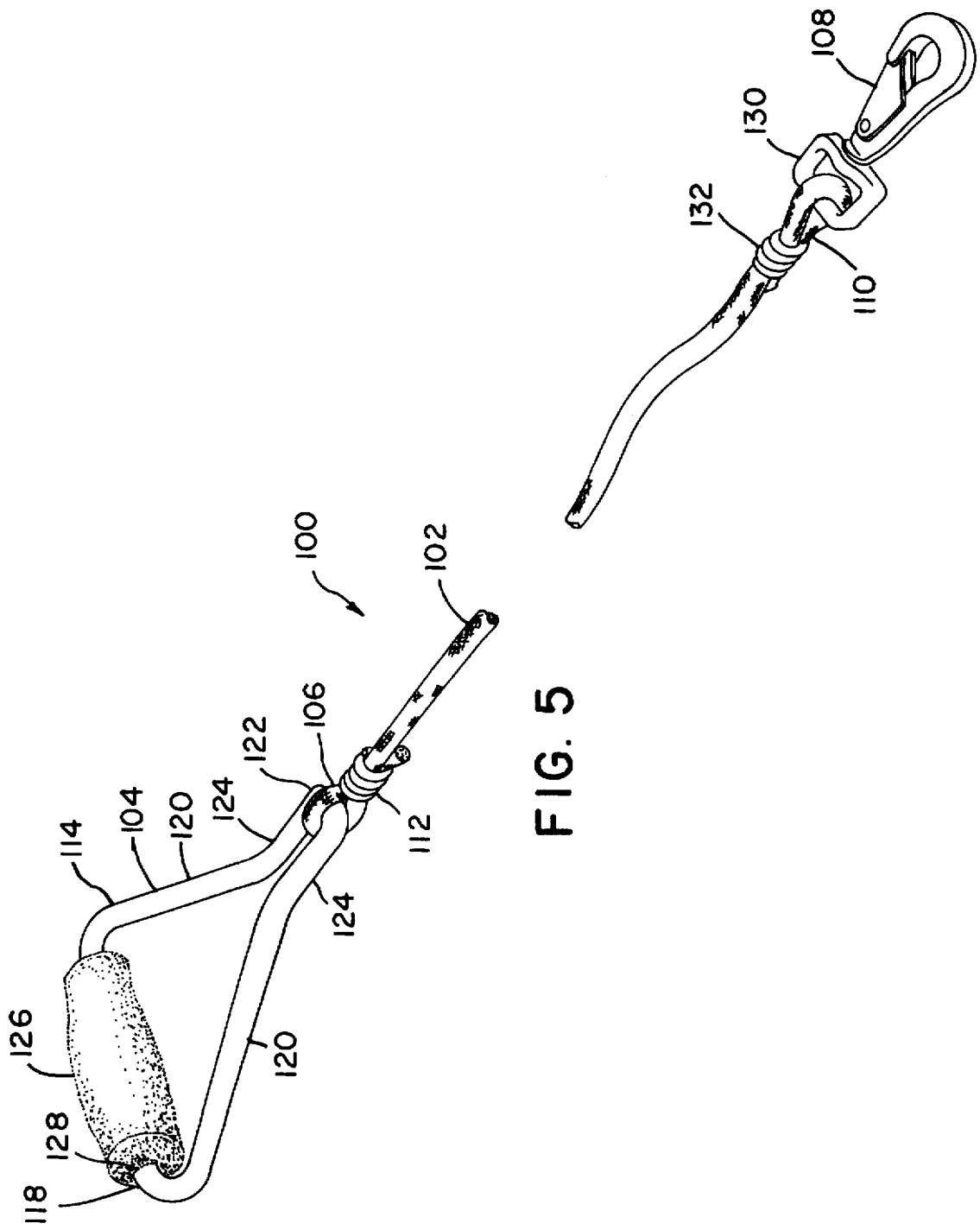
FIG. 5 is a perspective view of a second embodiment of the leash shown with a portion of the lead cut away.

A second embodiment of the leash of the present invention is denoted generally by the reference number 100 in FIG. 5. The leash 100 includes a lead 102, a handle loop 104 attached to the lead 102 at a proximal end 106, and a clip 108 or equivalent attachment means affixed to the lead 102 at a distal end 110. The lead 102 is formed of an elastic cord, preferably a solid elastic cord or a cord made of woven elastomeric material (commonly known as a "bungee cord"). The lead 102 is affixed to the handle loop 104 by inserting the proximal end 106 of the lead 102 within the handle loop 104 and then affixing the proximal end 106 to an adjacent portion of the lead 102 by use of a crimped wire loop 112 or other binding means.

Figure 6:
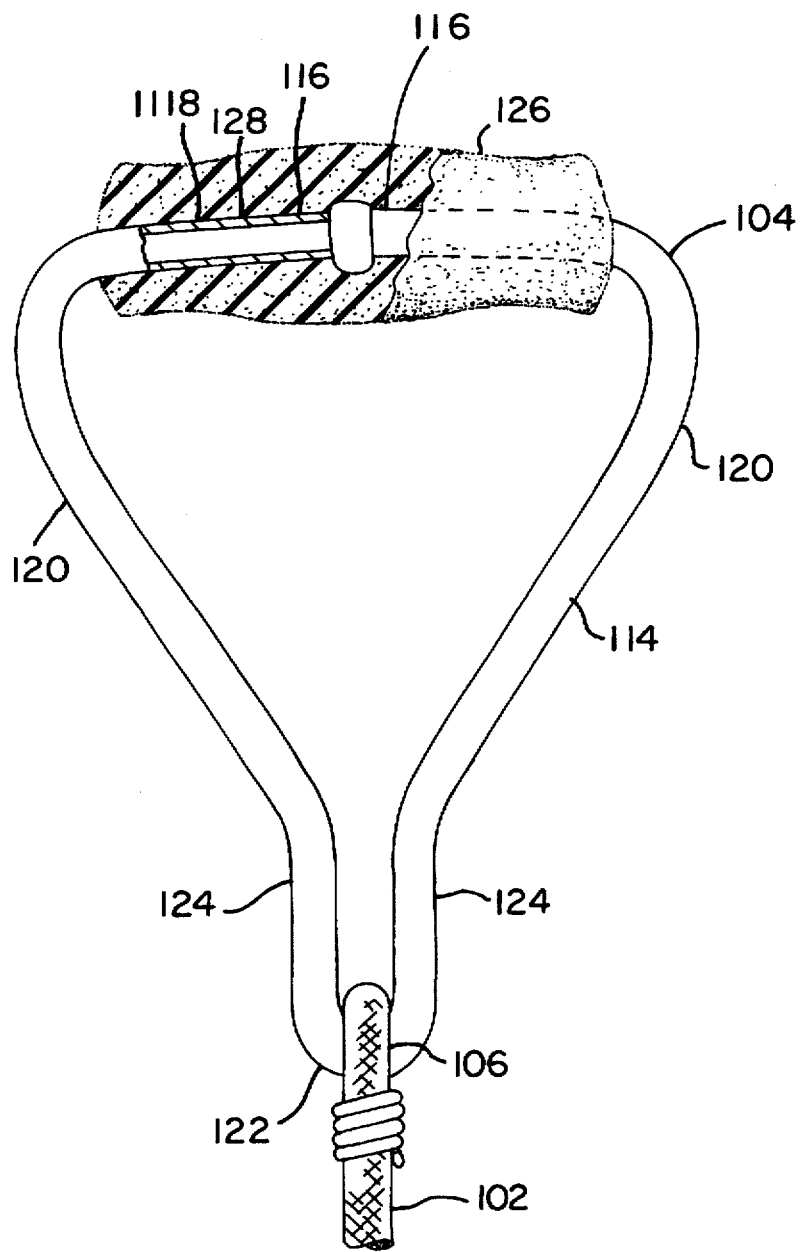
FIG. 6 is a side elevational view of the leash handle of FIG. 5 shown with a portion of the handle cut away from the handle loop.

As best illustrated by FIG. 6, the handle loop 104 is preferably formed from a metal rod-like or tubular loop member 114, such as a steel tube, which is bent into the shape illustrated so that its opposing ends 116 meet in abutting or closely spaced relation at a grip portion 118. The grip portion 118 is connected at its opposing sides to side portions 120, which are then attached to each other at a common vertex 122. Each side portion 120 includes a substantially linear portion 124 adjacent the vertex 122, and the linear portions 124 are aligned substantially parallel to each other. Thus, the handle loop 104 is formed into a generally triangular shape wherein the vertex 122 and linear portions 124 extend from a point of the triangle.

A generally compressible handle 126 is preferably disposed over the grip portion 118 to make the grip portion 118 more comfortable to grasp. As illustrated in FIG. 5, the handle 126 is preferably formed from a tubular foam member having an axially disposed passage 128 wherein the grip portion 118 of the handle loop 104 may be inserted. The handle 126 may be placed over the loop member 114 before it is bent to form the handle loop 104, and after the handle loop 104 is formed, the handle 126 may be slid about the handle loop 104 until it rests over the ends 116 of the loop member 114 at the grip portion 118. If desired, the opposing ends 116 of the loop member 114 may be joined by welding or other joining means before sliding the handle 126 over the grip portion 118. As illustrated in FIG. 6, a weld can serve to engage the ends 116 of the loop member 114 to close the handle loop 104, and also to engage the handle 126 and prevent it from sliding about the grip portion 118 when the leash 100 is in use. If desired, the rod-like or tubular loop member 114 used to form the handle loop 104 may be coated with an appropriately colored resilient coating, such as a rubber coating, to better prevent the handle 126 from slipping, to make the entire perimeter of the handle loop 104 more comfortable to grasp, and to prevent scratching of the loop member 114.

The clip 108 includes a clip base ring 130 to which it is rotatably attached. The distal end 110 of the lead 102 is attached to the clip base ring 130 by inserting the distal end 110 within the base ring 130 and affixing it to an intermediate point on the lead 102 by use of a crimped wire loop 132 or other binding means. The leash 100 may be easily stored for transport by coiling the lead about the linear portions 124 of the handle loop 104 and finally snapping the clip 108 about the grip portion 118 adjacent the handle 126, or about a side portion 120. In this coiled form, the leash 100 essentially stores flat.

It has been found that the leash 100 has an especially attractive and durable appearance when the colors of the handle loop 104, crimped wire coils 112 and 132, and clip 108 and clip base ring 130 are all coordinated or matched, and when the colors of the lead 102 and the handle 126 are also coordinated or matched. As an example, the metal portions may be formed in a silver color or may be anodized in gold, blue, green, etc., colors and the handle 126 and lead 102 may be made in a complementary color. The unique combination of tubular structural members, foam padding, and elastic cord or straps chosen for the leash 100 has appeal to consumers owing to its light weight and highly utilitarian (but stylish) appearance.

Figure 7:
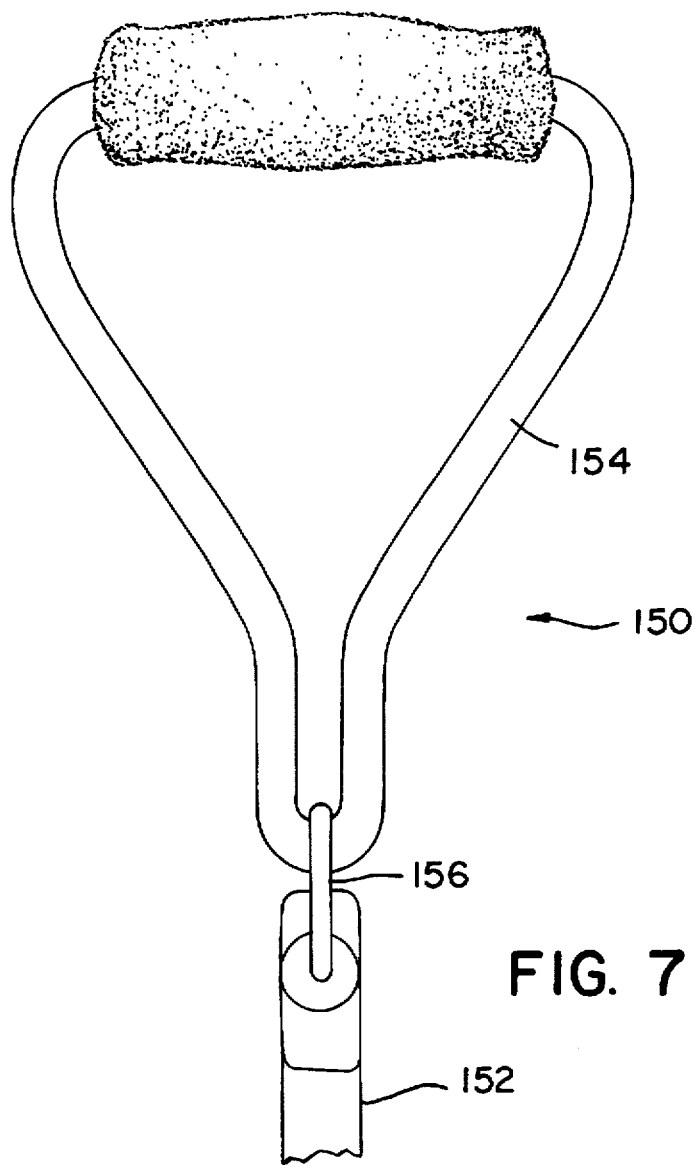
FIG. 7 is a side elevational view of a handle of a third embodiment of the leash.

A third embodiment of a leash according to the present invention is shown in FIG. 7 at the reference number 150. The leash 150 combines a strap-like elastomeric lead 152 (similar to the lead 12 of the leash 10) with a handle loop 154 (similar to the handle loop 104 of the leash 100). A ring 156 joins the lead 152 to the handle loop 154.

Figure 8:
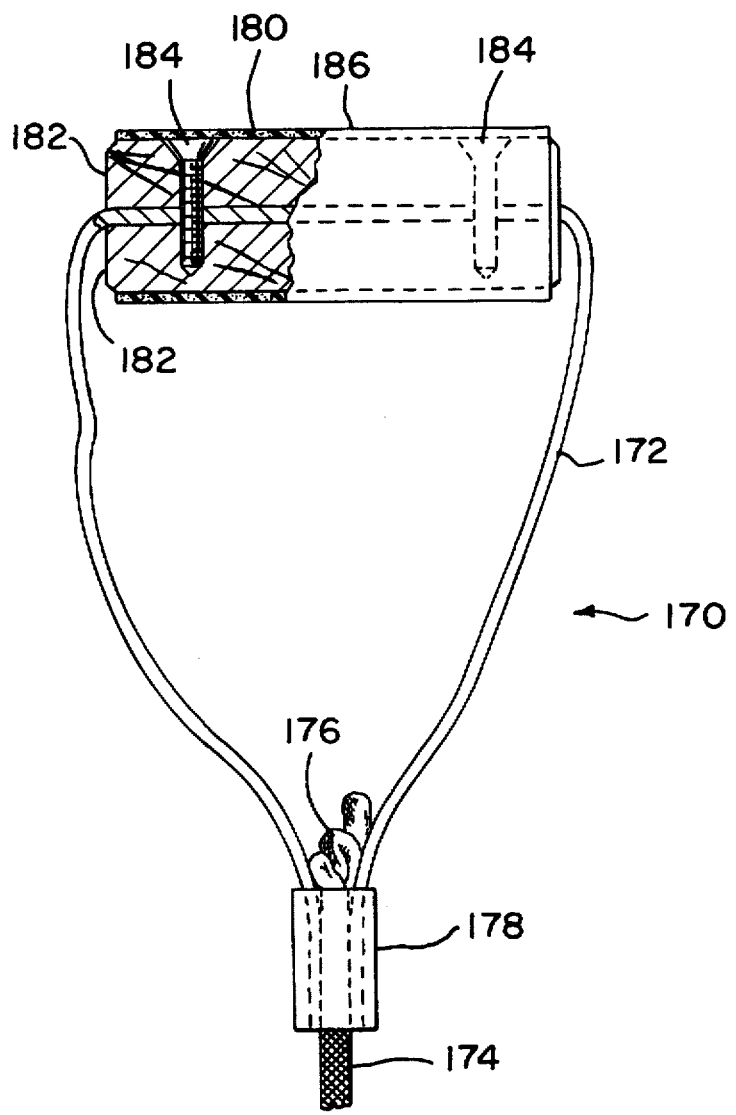
FIG. 8 is a side elevational view of a handle of a fourth embodiment of the leash.

A fourth embodiment of a leash according to the present invention is shown in FIG. 8 at the reference number 170. The leash 170 has a handle loop 172 which is generally similar to the handle loop 14 used in the leash 10, and a lead 174 which is formed of a woven elastomeric cord similarly to the lead 102 used in leash 100. A proximal end 176 of the lead 174 is knotted and a portion of the lead 174 adjacent the proximal end 176 is joined to the handle loop 172 by use of a crimped metal sleeve 178 or other binding means. A handle 180 formed of two semicylindrical handle members 182 is fit about the handle loop 172 in a manner similar to that described for the leash 10. The handle members 182 may be formed of the halves of a wooden dowel, and they may be firmly affixed to the handle loop 172 by driving fasteners 184 through each handle member 182 and through the handle loop 172 to prevent sliding of the handle across the loop 172. A handle sleeve 186 is fit over the handle members 182 and fasteners 184 to lend the animal owner a better and more comfortable grip on the handle 180.

It is understood that the invention is not confined to the particular construction of parts and uses described and illustrated above, and rather the invention embraces such modified embodiments that come within the scope of the following claims. Further, it is understood that in these claims, means plus function clauses are intended to cover the structures described herein as performing their recited function, and also both structural equivalents and equivalent structures. As an example, though a nail and a screw may not be structural equivalents insofar as a nail employs a cylindrical surface to secure parts together whereas a screw employs a helical surface, in the context of fastening parts, a nail and a screw are equivalent structures.

I claim:

1. A leash comprising:
   a. an elongated flexible and substantially inelastic strap having opposing strap ends;
   b. an elongated substantially elastic lead having a proximal end and a distal end;
   c. binding means for rigidly binding the strap ends to the proximal end of the lead, thereby forming a handle loop from the strap; and
   d. attachment means at the distal end of the lead for attachment to an animal.

2. The leash of claim 1 wherein the handle loop includes spacing means thereon for defining a rigid and generally straight grip portion on the handle loop.

3. The leash of claim 2 wherein the spacing means comprise a handle wherein the strap of the handle loop is disposed.

4. The leash of claim 1 further comprising a handle having a passage therein, wherein the strap is slidably disposed.

5. The leash of claim 4 wherein the handle includes two handle members disposed on opposing sides of the strap and a handle sleeve disposed about the handle members.

6. The leash of claim 5 wherein each handle member is substantially hollow.

7. The leash of claim 5 wherein the handle sleeve is formed of a flexible material.

8. The leash of claim 1 wherein the distal end of the lead is reinforced.

9. The leash of claim 1 wherein the lead consists of one of a woven strap, a woven cord, a molded strap, or a molded cord.

10. The leash of claim 9 wherein the strap is made of woven fabric material.

11. A leash comprising:
    a. a flexible and substantially inelastic handle loop including spacing means thereon for defining a rigid grip portion on the handle loop, and further including a soft handle sleeve disposed over the spacing means;
    b. an elongated substantially elastic lead having a proximal end and a distal end, wherein the proximal end is affixed to the handle loop at a point on the handle loop spaced from the grip portion; and c. attachment means at the distal end of the lead for attachment to an animal.

12. The leash of claim 11 wherein the lead consists of one of a rubber strap or a woven cord.

13. The leash of claim 11 wherein the handle loop is substantially rigid.

14. A leash comprising:
   a. a substantially rigid elongated loop member having two ends adjacently aligned, thereby defining a handle loop;
   b. a handle located on the handle loop and disposed over the two ends of the elongated loop member;
   c. a lead extending from the handle loop at a point spaced from the handle; and
   d. attachment means on the lead for attaching an animal to the lead.

15. The leash of claim 14 wherein the lead is substantially elastic.

16. The leash of claim 14 wherein the ends of the elongated loop member are joined.

17. The leash of claim 16 wherein the ends of the elongated loop member have a generally greater diameter than the remainder of the elongated loop member, thereby preventing slippage of the handle across the handle loop.

18. The leash of claim 14 wherein the elongated loop member is formed of rod-shaped material.

19. The leash of claim 14 wherein the elongated loop member is coated with resilient material.

20. The leash of claim 14 wherein the handle loop is generally triangular and includes a grip portion and two side portions extending therefrom and meeting at a common vertex, wherein the two ends of the elongated loop member are located on the grip portion, and further wherein the lead extends from the common vertex.

21. The leash of claim 20 wherein the side portions each include a substantially linear segment thereon, and further wherein the substantially linear segments are substantially parallel and meet at the common vertex.

* * * * *